United States Patent
Losh et al.

(10) Patent No.: US 7,558,575 B2
(45) Date of Patent: Jul. 7, 2009

(54) METHOD AND APPARATUS FOR WIRELESS COMMUNICATION IN A HIGH VELOCITY ENVIRONMENT

(75) Inventors: Jason H. Losh, Arlington, TX (US); Dale R. Anderson, Colleyville, TX (US)

(73) Assignee: Motorola Inc., Schaumburg, IL (US)

( * ) Notice: Subject to any disclaimer, the term of this patent is extended or adjusted under 35 U.S.C. 154(b) by 749 days.

(21) Appl. No.: 10/872,636

(22) Filed: Jun. 21, 2004

(65) Prior Publication Data
US 2005/0020203 A1    Jan. 27, 2005

Related U.S. Application Data

(60) Provisional application No. 60/489,796, filed on Jul. 24, 2003.

(51) Int. Cl.
*H04Q 7/20* (2006.01)
(52) U.S. Cl. .................. 455/441; 455/436; 455/437
(58) Field of Classification Search .......... 455/431–441
See application file for complete search history.

(56) References Cited

U.S. PATENT DOCUMENTS

| | | | |
|---|---|---|---|
| 5,444,762 A | 8/1995 | Frey et al. | |
| 5,557,656 A | 9/1996 | Ray et al. | |
| 5,832,280 A | 11/1998 | Ray et al. | |
| 5,878,345 A | 3/1999 | Ray et al. | |
| 5,878,346 A | 3/1999 | Ray et al. | |
| 5,884,166 A | 3/1999 | Ray et al. | |
| 5,884,178 A * | 3/1999 | Ericsson et al. | 455/441 |
| 5,946,621 A * | 8/1999 | Chheda et al. | 455/440 |
| 5,960,343 A | 9/1999 | Ray et al. | |
| 6,108,539 A | 8/2000 | Ray et al. | |
| 5,381,290 A1 | 4/2002 | Mostafa et al. | |
| 6,377,802 B1 | 4/2002 | McKenna et al. | |
| 6,408,180 B1 | 6/2002 | McKenna et al. | |
| 6,421,538 B1 * | 7/2002 | Byrne | 455/441 |
| 6,449,489 B1 | 9/2002 | Lu et al. | |
| 6,534,271 B2 | 3/2003 | Fürste et al. | |
| 6,542,745 B1 | 4/2003 | Mottier et al. | |
| 6,675,013 B1 | 1/2004 | Gross et al. | |
| 7,082,305 B2 * | 7/2006 | Willars et al. | 455/441 |
| 2004/0058687 A1 | 3/2004 | Kim et al. | |
| 2005/0075110 A1 | 4/2005 | Posti et al. | |

FOREIGN PATENT DOCUMENTS

| | | |
|---|---|---|
| JP | 2002027519 A | 1/2002 |
| JP | 2002159039 A | 5/2002 |
| KR | 20020051495 | 6/2002 |

* cited by examiner

*Primary Examiner*—Duc Nguyen
*Assistant Examiner*—Angelica M Perez
(74) *Attorney, Agent, or Firm*—Steven A. May (57) ABSTRACT

A communication system transitions from a high velocity mode of operation to a non-high velocity mode of operation based on a movement of a mobile station. When the communication system is in a high velocity mode of operation, the communication system promotes pilots from a High Velocity Neighbor Set of the mobile station or a controller. When the communication system is in a non-high velocity mode of operation, the communication system promotes pilots from a Neighbor Set of the mobile station or the controller. The communication system may further include a high velocity repeater that, when co-located with the mobile station, is capable of providing a communication link between the mobile station and a radio access network servicing the mobile station.

39 Claims, 5 Drawing Sheets

METHOD AND APPARATUS FOR WIRELESS COMMUNICATION IN A HIGH VELOCITY ENVIRONMENT

REFERENCE(S) TO RELATED APPLICATION(S)

The present application claims priority from provisional application, Ser. No. 60/489,796, entitled "METHOD AND APPARATUS FOR WIRELESS COMMUNICATION IN A HIGH VELOCITY ENVIRONMENT," filed Jul. 24, 2003, which is commonly owned and incorporated herein by reference in its entirety.

FIELD OF THE INVENTION

The present invention relates generally to wireless communication systems, and, in particular, to a provision of wireless communication services in a high velocity environment.

BACKGROUND OF THE INVENTION

Interim Standard IS-2000 has been adopted by the Telecommunications Industry Association for implementing cdma2000® in a cellular system. In a cdma2000 communication system, a mobile station (MS) communicates with any one or more of a plurality of base stations (BSs) dispersed in a geographic region. Each BS continuously transmits a pilot channel signal having the same spreading code but with a different code phase offset. Phase offset allows the pilot signals to be distinguished from one another, which in turn allows the BSs to be distinguished. Hereinafter, a pilot signal of a BS will be simply referred to as a pilot. The MS monitors the pilots and measures the received energy of the pilots.

The MS communicates with a BS providing wireless communication services to the MS via a forward link and a reverse link. The forward link typically includes one or more forward traffic channels, one or more forward control channels, and a paging channel. The reverse link typically includes one or more reverse traffic channels, one or more reverse control channels, and an access channel. During a call, the MS must constantly monitor and maintain four sets of pilots. The four sets of pilots are collectively referred to as the Pilot Set and include an Active Set, a Candidate Set, a Neighbor Set, and a Remaining Set. The Active Set comprises pilots associated with a forward traffic channel assigned to the MS. When the MS is in an idle mode, the Active Set comprises pilots associated with a paging channel or a forward control channel monitored by the MS. The Candidate Set comprises pilots that are not currently in the Active Set but have been received by the MS with sufficient strength to indicate that an associated forward traffic channel could be successfully demodulated. The Neighbor Set comprises pilots that are each transmitted from a BS to the MS and are possible candidates for handoff. The Remaining Set comprises all possible pilots in the current system on the current CDMA frequency assignment, excluding the pilots in the Neighbor Set, the Candidate Set, and the Active Set.

Typically, a BS provides communications services to MSs located in a coverage area serviced by the BS. When the MS is serviced by a first BS, the MS constantly searches pilot channels of neighboring BSs for a pilot that is sufficiently stronger than a threshold value. The MS signals the determination of a pilot that is sufficiently stronger than the threshold value to the first, serving BTS using a Pilot Strength Measurement Message. As the MS moves from a first coverage area serviced by a first BS to a second coverage area serviced by a second BS, the communication system promotes certain pilots from the Candidate Set to the Active Set and from the Neighbor Set to the Candidate Set. The serving BS notifies the MS of the promotions. Then, when the MS commences communication with a new BS that has been added to the Active Set before terminating communications with an old BS, a "soft handoff" has occurred. For the reverse link, typically each BS in the Active Set independently demodulates and decodes each frame or packet received from the MS. It is then up to a switching center to arbitrate between the each BS's decoded frames.

When an MS is operating in a high velocity environment, such as when the MS is located a high speed aircraft such as a commercial airplane, a conventional operation and handoff of the MS is fraught with problems. Typically, MSs include a mechanism for correcting for Doppler shifts in received signals resulting from the MS traveling at speeds of less than 120 kilometers per hour. However, when an MS is traveling at a speed in excess of 120 kilometers per hour, the MS is unable to fully compensate for the resulting Doppler shift in a received signal, resulting in an inability of the MS to properly demodulate the received signal. Furthermore, when an MS is traveling at an excessively a high rate of speed, new handoffs may be indicated before current handoffs may be completed, resulting in system inefficiencies and potentially resulting in dropped calls. Furthermore, pilots and associated BSs may be transferred in and out of the Neighbor Set so frequently that the Neighbor Set becomes somewhat useless.

Therefore, there exists a need for a method and apparatus for performing handoffs and Doppler compensation with respect to an MS traveling at a high velocity.

DETAILED DESCRIPTION OF THE INVENTION

To address the need for a method and an apparatus for performing handoffs and Doppler compensation with respect to an MS traveling at a high velocity, a communication system is provided that transitions from a high velocity mode of operation to a non-high velocity mode of operation based on a movement of a mobile station. When the communication system is in a high velocity mode of operation, the communication system promotes pilots from a High Velocity Neighbor Set of the mobile station or a controller. When the communication system is in a non-high velocity mode of operation, the communication system promotes pilots from a Neighbor Set of the mobile station or the controller. The communication system may further include a high velocity repeater that, when co-located with the mobile station, is capable of providing a communication link between the mobile station and a radio access network servicing the mobile station.

Generally, an embodiment of the present invention encompasses a method of wireless communication in a high velocity environment. The method includes maintaining, by a mobile station, a High Velocity Neighbor Set and a Neighbor Set, determining whether the mobile station is operating in a high velocity environment, and when the mobile station is operating in a high velocity environment, utilizing the High Velocity Neighbor Set for promotion of pilot signals.

Another embodiment of the present invention encompasses a mobile station that includes at least one memory device that maintains a plurality of neighbor sets, wherein a first neighbor set of the plurality of neighbor sets comprises a Neighbor Set and a second neighbor set of the plurality of neighbor sets comprises a High Velocity Neighbor Set. The mobile station further includes a processor coupled to the at least one memory device that determines whether the mobile station is operating in a high velocity environment and, in response to determining that the mobile station is operating in a high velocity environment, utilizes the High Velocity Neighbor Set for promotion of pilot signals.

Still another embodiment of the present invention encompasses a radio access network controller that includes at least one memory device that maintains multiple neighbor sets. The radio access network controller further includes a processor coupled to the at least one memory device that determines whether a mobile station serviced by the controller is operating in a high velocity environment. When the mobile station is operating in a high velocity environment, the processor adjusts a first neighbor set of the plurality of neighbor sets and conveys an instruction to promote a pilot based on the adjustment of the first neighbor set of the plurality of neighbor sets. When the mobile station is not operating in a high velocity environment, the processor adjusts a second neighbor set of the plurality of neighbor sets and conveys an instruction to promote a pilot based on the adjustment of the second neighbor set of the plurality of neighbor sets Yet another embodiment of the present invention encompasses a method of operating a mobile station in a high velocity environment. The method includes determining that the mobile station is operating in a high velocity environment, maintaining, by a mobile station, a Neighbor Set and a High Velocity Neighbor Set. The method further includes, in response to determining that the mobile station is operating in a high velocity environment, searching pilot signals associated with the High Velocity Neighbor Set for a pilot signal stronger than a threshold value and, in response to determining a pilot signal stronger than the threshold value, modifying an Active Set.

Still another embodiment of the present invention encompasses a mobile station that includes at least one memory device that maintains a Neighbor Set and a High Velocity Neighbor Set and a processor coupled to the at least one memory device. The processor determines whether the mobile station is operating in a high velocity environment, in response to determining that the mobile station is operating in a high velocity environment, searches pilot signals associated with the High Velocity Neighbor Set for a pilot signal stronger than a threshold value, and in response to determining a pilot signal stronger than the threshold value, modifies an Active Set.

Yet another embodiment of the present invention encompasses a method for promoting pilot signals in a high velocity environment. The method includes maintaining, by a mobile station, a Neighbor Set and a High Velocity Neighbor Set, searching pilot signals associated with at least one of the Neighbor Set and the High Velocity Neighbor Set for a pilot signal stronger than a threshold value, and upon determining a pilot signal stronger than the threshold value, transmitting information concerning the pilot signal. The method further includes, in response to transmitting information concerning the pilot signal, receiving instructions promote the pilot signal to an Active Set and, in response to receiving the instruction, promoting the pilot signal to the Active Set.

Still another embodiment of the present invention encompasses a radio access network controller that includes at least one memory device that maintains a Neighbor Set and a High Velocity Neighbor Set and a processor coupled to the at least one memory device. The processor receives information from the mobile station concerning a pilot signal stronger than a threshold value, determines that the mobile station is operating in a high velocity environment and, in response to receiving the information and determining that the mobile station is operating in a high velocity environment, adjusts a High Velocity Neighbor Set and conveys information to the mobile station corresponding to the adjustment.

Yet another embodiment of the present invention encompasses a radio access network controller that includes at least one memory device that maintains a Neighbor Set and a High Velocity Neighbor Set. The radio access network controller further includes a processor coupled to the at least one memory device that determines that a mobile station is operating in a high velocity environment and, in response to determining that the mobile station is operating in a high velocity environment, conveys a High Velocity Neighbor List to the mobile station.

Still another embodiment of the present invention encompasses a mobile station that includes at least one memory device that maintains multiple neighbor sets, wherein a first neighbor list of the multiple neighbor lists comprises a Neighbor Set and a second neighbor set of the multiple neighbor sets comprises a High Velocity Neighbor Set. The mobile station further includes a receiver that receives instructions from a wireless infrastructure to modify at least one of the multiple neighbor sets and a processor coupled to each of the at least one memory device and the receiver that is capable of modifying the at least one of the multiple neighbor sets in response to the received instructions.

Yet another embodiment of the present invention encompasses a method for providing wireless communication services in a high velocity environment that includes determining a frequency shift due, at least in part, to a movement of a repeater, applying a first frequency offset to a first signal received by the repeater, and applying a second frequency offset to a second signal transmitted by the repeater, wherein each frequency offset of the first frequency offset and the second frequency offset is based on the determined frequency shift.

Still another embodiment of the present invention encompasses a repeater capable of operating in a high velocity environment. The repeater includes a processor that determines a frequency shift due, at least in part, to a movement of the repeater when operating in the high velocity environment, applies a first frequency offset to a first signal received by the repeater when operating in the high velocity environment, and applies a second frequency offset to a second signal transmitted by the repeater when operating in the high velocity environment, wherein each of the first frequency offset and the second frequency offset is based on the determined frequency shift.

Yet another embodiment of the present invention encompasses a repeater that includes at least one memory device that stores mobile station functionality and a processor coupled to the at least one memory device. The processor executes the mobile station functionality and, by executing the mobile station functionality, is capable of determining at least one of a carrier and a modulation scheme associated with a radio access network (RAN) and, in response to determining the at least one of a carrier and a modulation scheme associated with the RAN, automatically tuning to frequencies associated with the RAN.

Still another embodiment of the present invention encompasses a method for operating a mobile station in a high velocity environment. The method includes maintaining a plurality of neighbor lists, wherein a first neighbor list of the plurality of neighbor lists comprises a high velocity neighbor list and a second neighbor list of the plurality of neighbor lists comprises a non-high velocity neighbor list.

Yet another embodiment of the present invention encompasses a mobile station that includes at least one memory device that maintains a plurality of neighbor lists, wherein a first neighbor list of the plurality of neighbor lists comprises a high velocity neighbor list and a second neighbor list of the plurality of neighbor lists comprises a non-high velocity neighbor list. The mobile station further includes a receiver that receives instructions from a wireless infrastructure to modify at least one of the plurality of neighbor lists and a processor coupled to each of the at least one memory device and the receiver that is capable of modifying the at least one of the plurality of neighbor lists in response to the received instructions.

Figure 1:
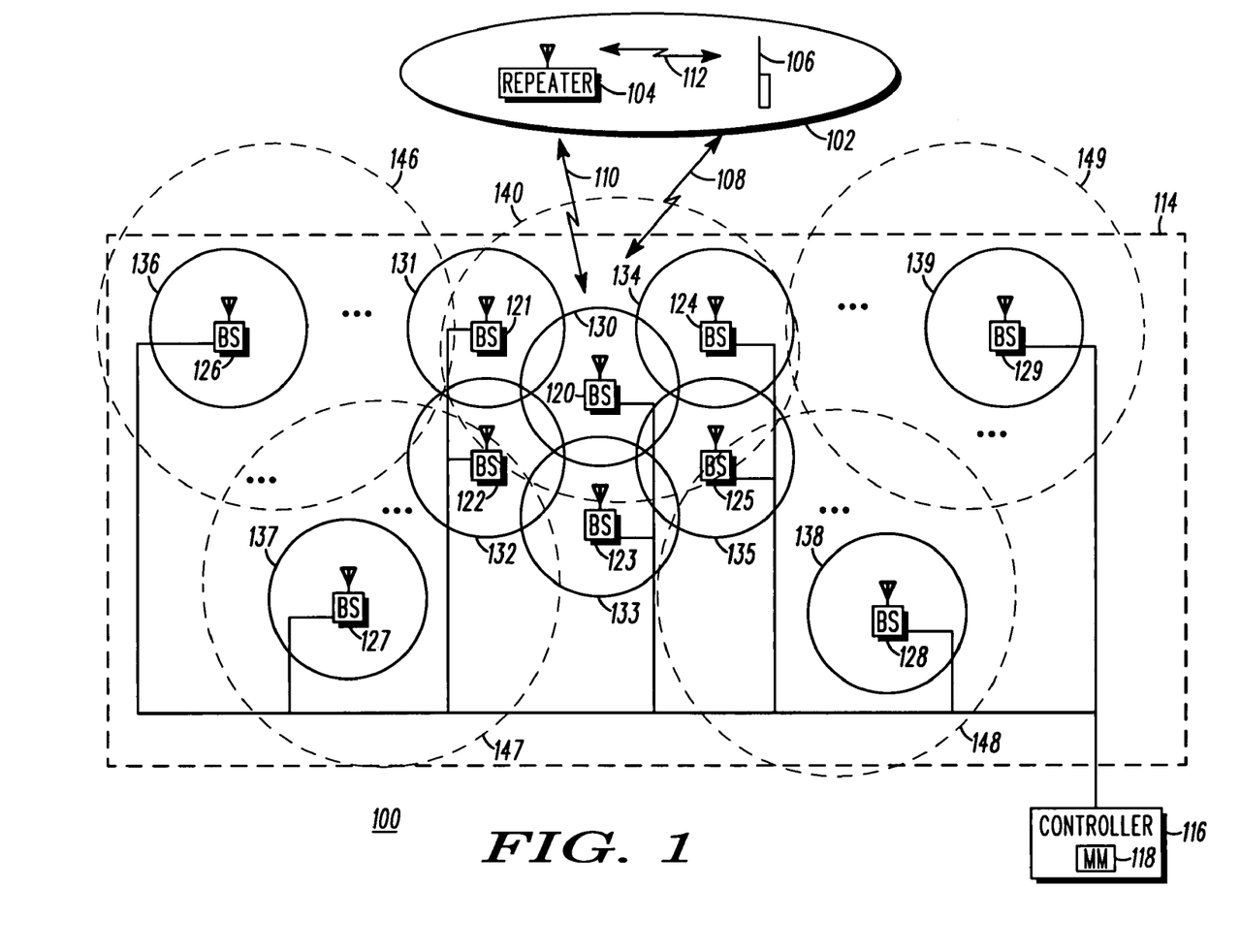
FIG. 1 is a block diagram of a wireless communication system in accordance with an embodiment of the present invention.

The present invention may be more fully described with reference to FIGS. 1-8. FIG. 1 is a block diagram of a wireless communication system 100 in accordance with an embodiment of the present invention. Communication system 100 includes a Radio Access Network (RAN) 114 that comprises multiple Base Stations (BSs) 120-129. Each BS of the multiple BSs 120-129 includes at least one base transceiver station (BTS), which BTS wirelessly interfaces with the mobile stations located in a respective non-high velocity coverage area, or cell, 130-139 serviced by the BS. Communication system 100 further includes a RAN controller 116, preferably a Centralized Base Station Controller (CBSC), coupled to each BS of the multiple BSs 120-129. RAN controller 116 includes a Mobility Manager (MM) 118 that maintains, for each mobile station (MS) serviced by the RAN controller, a record of a location of the MS and a number of handoffs engaged in by the MS. In another embodiment of the present invention, RAN controller 116 may be distributed among the multiple BSs 120-129. RAN 114 and RAN controller 116 are collectively referred to herein as a terrestrial wireless infrastructure.

Communication system 100 further includes a mobile station (MS) 106, such as a cellular telephone, a radiotelephone, a wireless modem associated with data terminal equipment (DTE) such as a personal computer (PC) or a laptop computer, or a personal digital assistant (PDA) with wireless communication capabilities. MS 106 is provided wireless communication services by RAN 114, and in particular by a BS of the multiple BSs 120-129 of communication system 100, via a first air interface 108 and/or via a combination of a second air interface 110, a repeater 104, and a third air interface 112. Each air interface 108, 110, 112 includes a forward link comprising multiple communication channels, preferably including at least one paging channel, at least one forward control channel, and at least one forward traffic channel. Each air interface 108, 110, 112 further includes a reverse link comprising multiple communication channels, preferably including an access channel, at least one reverse control channel, and at least one reverse traffic channel.

When a vehicle 102 that is capable of traveling at a high velocity, such as a non-terrestrial vehicle such as an aircraft or a terrestrial vehicle such as a high speed train, is operating in communication system 100, the communication system may further include a high velocity repeater 104 that resides in the vehicle. When an MS, such as MS 106, is located in vehicle 102, the MS may communicate with RAN 114 via high velocity repeater 104 instead of communicating directly with the RAN. Since the MS is co-located with high velocity repeater 104, the MS and the repeater each experience approximately a same Doppler shift with respect to signals exchanged with RAN 114. As a result, high velocity repeater 104 may provide Doppler shift compensation for the MS that the MS is not capable of providing itself. Furthermore, by providing a high velocity repeater 104 that is co-located with MS 106, the MS may transmit at lower power levels than the power levels that would be required for the MS to acceptably transmit signals directly to RAN 114. By reducing the transmit power level of MS 106, the possibility of the MS interfering with other communications involving RAN 114 or high velocity repeater 104 is reduced. In addition, by reducing the transmit power level of MS 106, a limited life power source, such as a battery, that supplies power to the MS may be preserved.

Communication system 100 comprises a wireless packet data communication system. In order for an MS, such as MS 106, to establish a packet data connection with an external network (not shown) connected to the infrastructure of communication system 100, each of repeater 104, BSs 120-129, and RAN controller 116 operate in accordance with well-known wireless telecommunications protocols. By operating in accordance with well-known protocols, a user of MS 106 can be assured that MS 106 will be able to communicate with the infrastructure and establish a packet data communication link with the external network via the infrastructure. Preferably, communication system 100 operates in accordance with the 3GPP2 and TIA/EIA (Telecommunications Industry Association/Electronic Industries Association) IS-2000, or IOS (Inter Operability Specification), standard, which provides a compatibility standard for cdma2000 or 1xEV-DO, systems, wherein each communication channel of air interfaces 108, 110, and 112 comprises at least one orthogonal code, such as a Walsh code. The standard specifies wireless telecommunications system operating protocols, including radio system parameters and call processing procedures. However, those who are of ordinary skill in the art realize that communication system 100 may operate in accordance with any one of a variety of wireless packet data communication systems, such as other CDMA technologies like W-CDMA, a Global System for Mobile communication (GSM) communication system, a Time Division Multiple Access (TDMA) communication system, a Frequency Division Multiple Access (FDMA) communication system, or an Orthogonal Frequency Division Multiple Access (OFDM) communication system.

When an MS of communication system 100, such as MS 106, is engaged in an active communication, the MS operates in soft handoff (SHO) mode wherein the MS is in wireless communication with multiple BSs in an Active Set of the MS. That is, when engaged in an active communication, the MS multi-casts data packets to each BS corresponding to a pilot in the Active Set of the MS. For example, when MS 106 is operating in a non-high velocity mode, the MS may be serviced by BS 120 servicing cell 130, and may be in a 3-way soft handoff with BS 121 serving cell 131 and BS 122 serving cell 132. The pilots signals corresponding to the BSs associated with the cells concurrently servicing the MS, that is, the pilots signals (hereinafter referred to as "pilots") corresponding to BS 120, BS 121, and BS 122, are the Active Set of the MS. In other words, the MS is in soft handoff (SHO) with BSs 120, 121, and 122, which BSs are associated with the cells 130, 131, and 132 servicing the MS, and which BSs are the Active Set of the MS.

In another embodiment of the present invention, a "sectorized" embodiment, each cell 130-139 may be divided into multiple geographic sectors. Each sector of the multiple geographic sectors is serviced by a BTS included in the BS servicing the cell. In the sectorized embodiment, an MS residing in a sector of a cell is serviced by BTS servicing the sector, and the Active Set of the MS comprises a pilot associated with the BTS servicing the MS and pilots associated with BTSs servicing other sectors of the cell or sectors of other cells.

Figure 2:
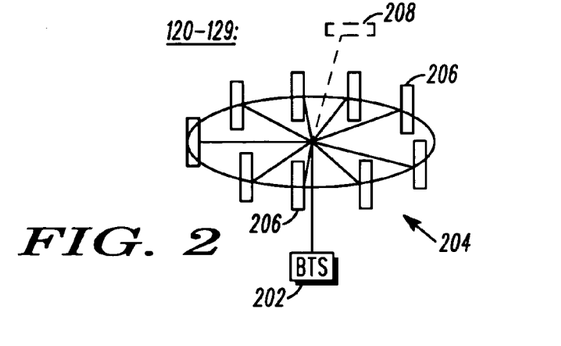
FIG. 2 is a block diagram of a base station of FIG. 1 in accordance with an embodiment of the present invention.

FIG. 2 is a block diagram of a BS 120-129 in accordance with an embodiment of the present invention. As depicted in FIG. 2, each BS 120-129 includes at least one BTS 202 that is coupled to an antenna 204. Antenna 204 includes a least one antenna element 206 (nine shown) that generates a radio frequency (RF) signal radiation pattern that is substantially co-planar with the Earth's surface and is designed to provide communication services to terrestrial-based communication devices. In the sectorized embodiment, antenna 204 may be a directional antenna that is divided into multiple antenna sectors, wherein each sector of the multiple antenna sectors corresponds to, and provides communications service to, a respective geographic sector of the multiple geographic sectors of the corresponding cell. Each antenna sector comprises an antenna array that includes multiple antenna elements. By utilizing an antenna array to broadcast signals to an MS located in the cell sector serviced by the antenna array, the BS is able to utilize one of numerous known beamforming methods for the broadcast of the signals.

When a BS 120-129 is a high velocity BS, such as BSs 120 and 126-129, antenna 204 may further include one or more non-terrestrial antenna elements 208 (one shown) for transmission of signals to, and reception of signals from, non-terrestrial communication devices. The one or more non-terrestrial antenna elements 208 generate a radio frequency (RF) signal radiation pattern that is above the horizontal plane encompassing the radiation pattern of the at least one antenna element 206, thereby avoiding interference with signals transmitted by the at least one antenna element 206. In addition, a polarization of radio signals radiating from the one or more non-terrestrial antenna elements 208 may be designed to be substantially orthogonal to a polarization of radio signals radiating from the at least one antenna element 206, thereby further minimizing any interference produced by the one or more non-terrestrial antenna elements 208 with respect to the at least one antenna element 206. For example, the beams radiated by the one or more non-terrestrial antenna elements 208 may be vertically polarized, as opposed to a horizontal polarization of beams radiated by the at least one antenna element 206.

Each high velocity BS 120, 126-129, in addition to providing communication services to MSs located in a non-high velocity coverage area associated with the BS, that is, coverage areas 130 and 136-139, further provides communication services to MSs located in a respective high velocity coverage area 140, 146-149, associated with the BS. High velocity coverage areas 140, 146-149 may be broader than their respective non-high velocity coverage areas 130 and 136-139 both due to the desirability of reduced handoffs of an MS when the MS is operating in a high velocity mode and further due to the fact that an MS located in a high speed aircraft is often in line-of-sight communication with a serving BS, which allows for a wider coverage area by the BS.

Figure 3:
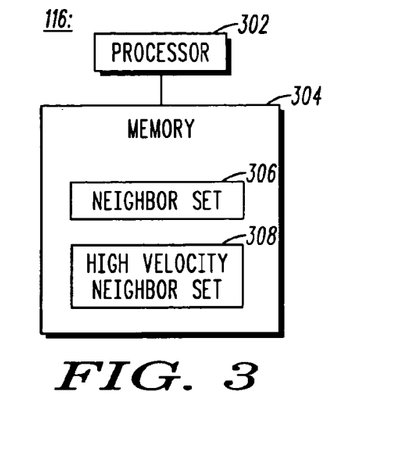
FIG. 3 is a block diagram of Radio Access Network controller of FIG. 1 in accordance with an embodiment of the present invention.

FIG. 3 is a block diagram of RAN controller 116 in accordance with an embodiment of the present invention. RAN controller 116 includes a processor 302, such as one or more microprocessors, microcontrollers, digital signal processors (DSPs), combinations thereof or such other devices known to those having ordinary skill in the art, and one or more associated memory devices 304, such as random access memory (RAM), dynamic random access memory (DRAM), and/or read only memory (ROM) or equivalents thereof, that maintain data and programs that may be executed by the corresponding processor. Unless otherwise specified herein, all functions performed by RAN controller 116 or by MM 118 are performed by processor 302 of the RAN controller.

The one or more memory devices 304 further maintain for each BS, such as BS 120, serviced by the controller a Neighbor Set 306 and a High Velocity Neighbor Set 308. Neighbor Set 306 comprises a list of pilots that are not currently in an Active Set or a Candidate Set associated with the MS but are possible candidates for handoff when communication system 100 is in a non-high velocity mode of operation. Similarly, High Velocity Neighbor Set 308 comprises a list of pilots that are not currently in an Active Set or a Candidate Set associated with the MS but are possible candidates for handoff when communication system 100 is in a high velocity mode of operation, that is, are pilots that are possible candidates for handoff and are associated with high velocity BSs.

MM 118 is implemented in processor 302 and the one or more memory devices 304 of the controller. MM 118 is responsible for managing mobility by defining the members of the Active Sets, Neighbor Sets, and High Velocity Neighbor Sets associated with RAN 114 and for coordinating multicast/multireceive groups.

Figure 4:
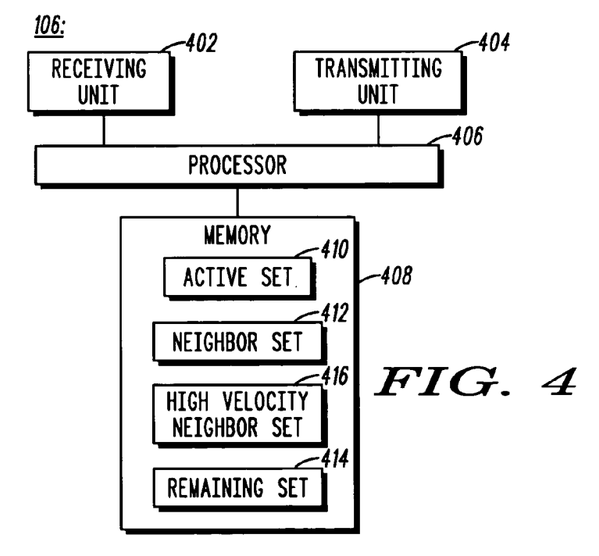
FIG. 4 is a block diagram of a mobile station of FIG. 1 in accordance with an embodiment of the present invention.

FIG. 4 is a block diagram of MS 106 in accordance with an embodiment of the present invention. MS 106 includes a receiving unit 402 and a transmitting unit 404 coupled to a processor 406, such as one or more microprocessors, microcontrollers, digital signal processors (DSPs), combinations thereof or such other devices known to those having ordinary skill in the art, and one or more associated memory devices 408, such as random access memory (RAM), dynamic random access memory (DRAM), and/or read only memory (ROM) or equivalents thereof, that maintain data and programs that may be executed by the corresponding processor. Unless otherwise specified herein, all functions performed by MS 106 are performed by processor 406 of the MS, which receives signals via receiving unit 402 and transmits signals via transmitting unit 404.

The one or more memory devices 408 maintain an Active Set 410, a Neighbor Set 412, and a Remaining Set 414. Active Set 410 comprises a list of pilots associated with a forward traffic channel assigned to the MS when the MS is engaged in an active communication or, when the MS is in an idle mode, a list of pilots associated with a paging channel or a forward control channel monitored by the MS. Neighbor Set 412 comprises a list of pilots that are not currently in the Active Set or a Candidate Set of the MS but are possible candidates for handoff. Remaining Set 414 comprises a list of pilots associated with all other BSs in communication system 100 that are not a member of Active Set 410, the Candidate Set, Neighbor Set 412, or a High Velocity Neighbor Set 416 of the MS. The one or more memory devices 408 may further maintain a High Velocity Neighbor Set 416 that comprises a list of pilots associated with high velocity BSs and that are not currently in the Active Set or a Candidate Set of the MS but are possible candidates for handoff. When MS 106 includes High Velocity Neighbor Set 416, the pilots of the High Velocity Neighbor Set are not included among the pilots of the Remaining Set.

Figure 5:
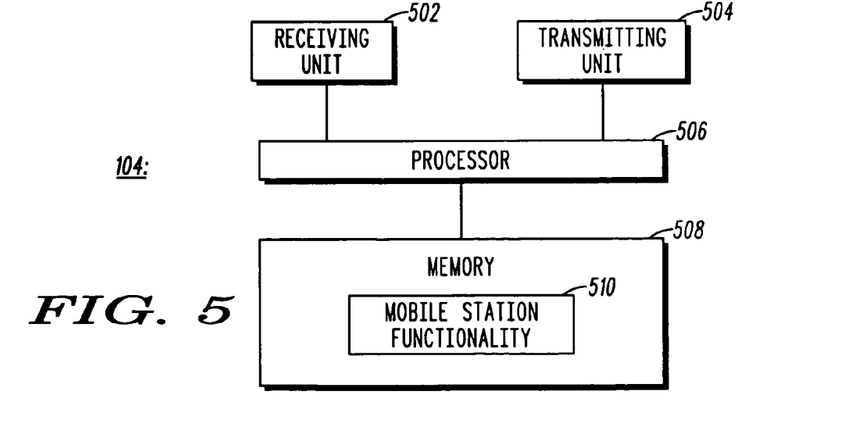
FIG. 5 is a block diagram of a high velocity repeater of FIG. 1 in accordance with an embodiment of the present invention.

FIG. 5 is a block diagram of high velocity repeater 104 in accordance with an embodiment of the present invention. Repeater 104 includes a receiving unit 502 and a transmitting unit 504 coupled to a processor 506, such as one or more microprocessors, microcontrollers, digital signal processors (DSPs), combinations thereof or such other devices known to those having ordinary skill in the art. Repeater 104 further comprises one or more memory devices 508 coupled to processor 506, such as random access memory (RAM), dynamic random access memory (DRAM), and/or read only memory (ROM) or equivalents thereof, that maintain data and programs that may be executed by the corresponding processor. Unless otherwise specified herein, all functions performed by repeater 104 are performed by processor 506 of the repeater, which receives signals via receiving unit 502 and transmits signals via transmitting unit 504.

Embedded in the one or more memory devices 508 is mobile station (MS) functionality 510, such as data and programs that allow repeater 104 to perform functions that are typically associated with MSs, and in particular the functionality of multiple-band and multiple-mode MSs, such as MSs capable of operating in multiple frequency bands and further capable of operating in multiple communication systems, such as but not limited to two or more of CDMA, GSM, and TDMA. In particular, repeater 104, and in particular one or more memory devices 508, includes programs that allow the repeater, and in particular processor 506, to scan pilots and paging channels of the RAN 114 and thereby determine a carrier and/or a modulation scheme associated with the RAN. Upon determining a carrier and/or a modulation scheme associated with the RAN, repeater 104 automatically tunes to frequencies associated with a forward link and a reverse link of the RAN in the same way that a multi-band multi-mode MS tunes to the frequencies of a communication system detected by the MS. As a result, as the vehicle in which the repeater resides, that is, vehicle 102, travels among various communication systems, the repeater may be able to automatically configure itself to operate in whatever system it currently resides.

Communication system 100 includes handoff procedures by which MS 106 can be handed off from a first air interface whose quality has degraded to another, higher quality air interface. When MS 106 is operating in a non-high velocity environment, that is, when MS 106 is stationary or is moving at a low rate of speed, such as at a speed of less than 120 kilometers per hour, communication system 100 provides for a handoff of the MS in accordance with well-known handoff techniques. For example, when MS 106 is active on a traffic channel and is serviced by a first BS, such as BS 120, the MS constantly searches pilot channels of neighboring BSs, that is, BSs in Neighbor Set 412, for a pilot that is sufficiently stronger than a threshold value. The MS signals this event to the first, serving BTS. As the MS moves from a first cell serviced by a first BS, that is, BS 120, toward a second cell serviced by a second BS, such as BS 124, communication system 100 promotes certain pilots from Neighbor Set 412, such as pilots associated with BSs 124 and 125, to Active Set 410. The serving BS, that is, BS 120, notifies the MS of the promotions via a neighbor list update message that is broadcast over the traffic channel. Upon receiving the neighbor list update message, MS 106 makes the appropriate changes to the list of pilots maintained in Neighbor Set 412 and Active Set 410. When a new BS is added to Active Set 210, MS 106 then commences communication with the new BS. MS 106 may further terminate communications with an old BS when a BS is dropped from the Active Set.

When MS 106 is operating in a high velocity environment, that is, when the MS is located in a vehicle, such as vehicle 102, that is moving at a high velocity, such as at a speed of greater than 120 kilometers per hour, a conventional operation and handoff of the MS is fraught with problems. Typically, an MS include a mechanism for correcting for Doppler shifts in received signals resulting from the MS traveling at speeds of less than 120 kilometers per hour. However, when an MS is traveling at an excessive rate of speed, for example, a speed in excess of a maximum speed at which an MS is designed to provide Doppler shift compensation, the MS is unable to fully compensate for the resulting Doppler shift in a received signal. Furthermore, when an MS is traveling at an excessive rate of speed, new handoffs may be indicated before current handoffs may be completed, resulting in system inefficiencies and potentially resulting in dropped calls. Furthermore, pilots and associated BSs may be transferred in and out of Neighbor Set 412 so frequently that the Neighbor Set becomes somewhat useless.

Figure 6:
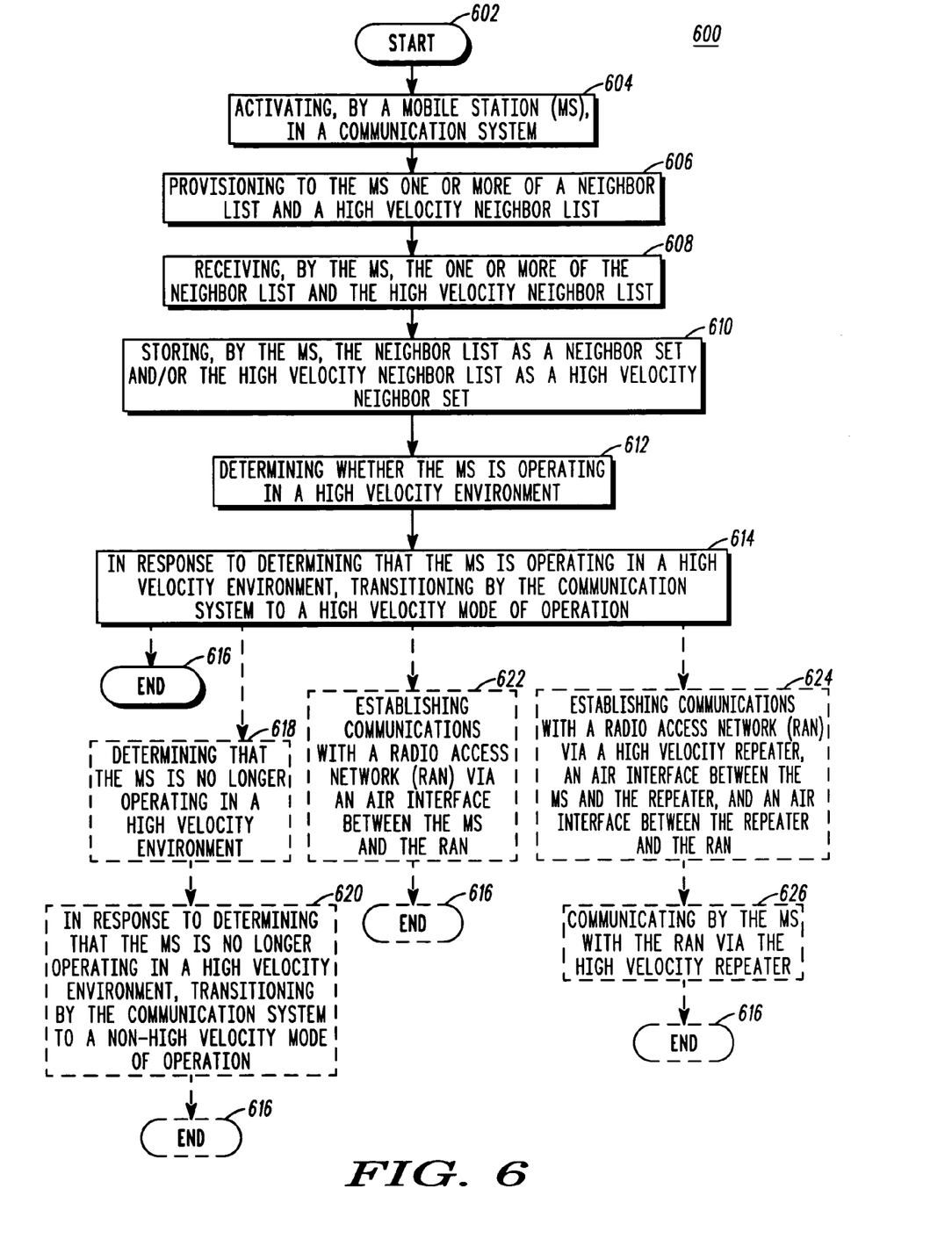
FIG. 6 is a logic flow diagram of a high velocity mode of operation of the communication system of FIG. 1 in accordance with various embodiments of the present invention.

As a result, communication system 100 transitions to a high velocity mode of operation when an MS, such as MS 106, is operating in a high velocity environment. FIG. 6 is a logic flow diagram 600 of a high velocity mode of operation of communication system 100 in accordance with various embodiments of the present invention. Logic flow diagram begins (602) when MS 106 activates (604) in communication system 100. Upon activating in the communication system, RAN controller 116 provisions (606) to the MS, and the MS receives (608) from the RAN controller 116, one or more of a Neighbor List and a High Velocity Neighbor List. The Neighbor List is based on the pilots included in Neighbor Set 306 of RAN controller 116. The High Velocity Neighbor List is based on the pilots included in High Velocity Neighbor Set 308 of RAN controller 116. In one embodiment of the present invention, where MS 106 is in idle mode, RAN controller 116 may provision both a Neighbor List and a High Velocity Neighbor List to the MS via a paging channel. In another embodiment of the present invention, where MS 106 is active on a forward traffic channel, RAN controller 116 may provision a Neighbor List and/or a High Velocity Neighbor List to the MS via the forward traffic channel. In still another embodiment of the present invention, RAN controller 116 may convey the High Velocity Neighbor List to the MS via the forward traffic channel in response to determining, as described in detail below, that the MS is operating in a high velocity environment.

At any time when MS 106 is in communication with RAN 114, and in particular with a serving BS 120, the MS may communicate with the RAN directly, that is, via air interface 108, or via repeater 104 and air interfaces 110 and 112. References herein to a forward link, paging channel, forward traffic channel, and forward control channel may then refer to a forward link, paging channel, forward traffic channel, and forward control channel of air interface 108 or of air interfaces 110 and 112. Similarly, references herein to a reverse link, access channel, reverse traffic channel, and reverse control channel may then refer to a reverse link, paging channel, reverse traffic channel, and reverse control channel of air interface 108 or of air interfaces 110 and 112.

Upon receiving the one or more of a Neighbor List and a High Velocity Neighbor List, MS 106 then stores (610) the received Neighbor List as a Neighbor Set 412 and/or the received High Velocity Neighbor List as a High Velocity Neighbor Set 416 in the one or more memory devices 408 of the MS. Typically, each of Neighbor Set 306 and the Neighbor List comprises a list of pilots corresponding to each of multiple BSs adjacent to BSs associated with an Active Set of an MS. In contrast to the Neighbor Set and Neighbor List, the High Velocity Neighbor List comprises a list of pilots corresponding to each of multiple geographically diverse BSs, such as BSs 120 and 126-129, that is, 'high velocity' BSs. For example, each of the High Velocity Neighbor Set 308 and the High Velocity Neighbor List may comprise pilots associated with every 'Nth" BS, wherein the value of 'N' is up to a designer of communication system 100. In one embodiment of the present invention, a distribution of BSs associated with each of High Velocity Neighbor Set 308 and the High Velocity Neighbor List is determined so that a number of handoffs is minimized when an MS is traveling at a high rate of speed, while the BSs are not so widely dispersed that the MS traveling at a high rate of speed may not be able to find an acceptable signal when a quality of a signal quality associated with a BS of the Active Set declines to an unacceptable level. In addition, the BSs associated with each of High Velocity Neighbor Set 308 and the High Velocity Neighbor List may be sufficiently close such that an MS is able to operate in a soft handoff mode.

Communication system 100, and in particular MS 106 or RAN controller 116, further determines (612) whether MS 106 is operating in a high velocity environment. When MS 106 is in an idle mode, the MS may self-determine whether the MS is operating in a high velocity environment. When the MS is engaged in an active communication on a traffic channel, RAN 114, and in particular the BS serving the MS, that is, BS 120, or RAN controller 116, may determine whether the MS is operating in a high velocity environment.

In one embodiment of the present invention, MS 106 or RAN controller 116 may determine whether MS 106 is operating in a high velocity environment based on a quantity of different best pilot signals determined by the MS within a predetermined period of time. When MS 106 is in idle mode, the MS constantly monitors the pilots of BSs associated with Active Set 410 and Neighbor Set 412 as the MS travels through communication system 100. Periodically, MS 106 determines a quality metric with respect to each pilot monitored by MS 106, such as a frame error rate, a signal-to-noise ratio (SNR), or a signal strength. Based on the quality metrics determined for each of the pilots monitored by the MS, MS 106 then determines a best pilot signal. MS 106 may then store information concerning the determined best pilot signal in the one or more memory devices 408 of the MS and/or may convey information concerning the determined best pilot signal to serving BS 120, and thereby to RAN controller 116, in a Pilot Strength Measurement Message (PSMM). As a result of the MS periodically determining a best pilot signal, multiple best pilot signals are determined.

Based on the multiple best pilot signals determined by MS 106, the MS, serving BS, or RAN controller 116 may determine a quantity of different best pilot signals determined within a predetermined period of time. Preferably, each best pilot signal of the quantity of different best pilot signals is different than the other best pilot signals of the quantity of different best pilot signals, thereby avoiding consideration of a situation where the MS is operating in a fringe area of each of multiple cells and where the MS is just switching back and forth among the pilots of the multiple cells in determining a best pilot. The MS, serving BS, or RAN controller 116, whichever is appropriate, then compares the quantity of best pilots determined within a predetermined period of time to a best pilot signal quantity threshold, which threshold may be respectively stored in the one or more memory devices 304, 408. When the quantity of best pilots determined within the predetermined period of time exceeds the best pilot signal quantity threshold, the MS, serving BS, or RAN controller 116 may determine that the MS is operating in a high velocity environment.

In another embodiment of the present invention, MS 106 or RAN controller 116 may determine whether the MS is operating in a high velocity environment based on a period of time during which the MS is serviced by a same BS. That is, each time MS 106 changes the BS serving the MS, MS 106 or RAN controller 116 stores information in the respective one or more memory devices 304, 408 concerning the time at which the MS changed the serving BS. Based on the stored times, MS 106 or RAN controller 116 further determines and stores in the respective one or more memory devices 304, 408 a length of time, that is a period of time, during which the MS was served by the most recently changed serving BS. The MS or RAN controller then compares the determined length of time to a time threshold stored in the respective one or more memory devices 304, 408. When the length of time is less than the time threshold, the MS or RAN controller determines that MS 106 is operating in a high velocity environment. However, in order to assure that the MS did not merely activate at the fringe of a cell and then move into an adjacent cell, MS 106 or RAN controller 116 may further determine a successive number of times that the determined length of time is less than the time threshold. When the successive number of times that the determined length of time is less than the time threshold exceeds a serving BS change threshold, which threshold may be stored in the respective one or more memory devices 304, 408, the MS or RAN controller determines that the MS is operating in a high velocity environment.

In yet another embodiment of the present invention, MS 106 may determine whether the MS is operating in a high velocity environment based on a Doppler shift of signals received by the MS from RAN 114. Upon receiving a pilot from a BS serving the MS, MS 106 determines a Doppler shift of the pilot and compares the determined Doppler shift to a Doppler shift threshold that is stored in the one or more memory devices 304. When the determined Doppler shift exceeds the Doppler shift threshold, the MS determines that it is operating in a high velocity environment.

In still another embodiment of the present invention, RAN controller 116 may determine whether the MS is operating in a high velocity environment based on a quantity of handoffs involving the MS during a predetermined period of time. Each time MS 106 engages in a handoff, information concerning the handoff is stored in MM 118. As a result, MM 118 maintains a record of a quantity of handoffs engaged in by MS 106. RAN controller 116, or MM 118, then determines a quantity of handoffs engaged in by MS 106 during the predetermined period of time and compares the quantity of handoffs to a handoff quantity threshold. When the quantity of handoffs engaged in during the predetermined period of time exceeds the handoff quantity threshold, RAN controller 116, or MM 118, determines that MS 106 is operating in a high velocity environment.

In response to determining that the MS is operating in a high velocity environment, communication system 100 transitions (614) to a high velocity mode of operation and logic flow 600 ends (616). In one embodiment of the present invention, when communication system 100 is in the high velocity mode of operation and MS 106 is in idle mode, the MS uses High Velocity Neighbor Set 416 to promote pilots to Active Set 410. In another embodiment of the present invention, when communication system 100 is in the high velocity mode of operation and MS 106 is actively engaged in a communication via a forward traffic channel, RAN controller 116 uses High Velocity Neighbor Set 308 to push neighbor list updates to MS 106. By using High Velocity Neighbor Set 416 or High Velocity Neighbor Set 308 to promote pilots to Active Set 410 when in a high velocity mode, communication system 100 is able to begin restricting handoffs to high velocity BSs.

Figure 7:
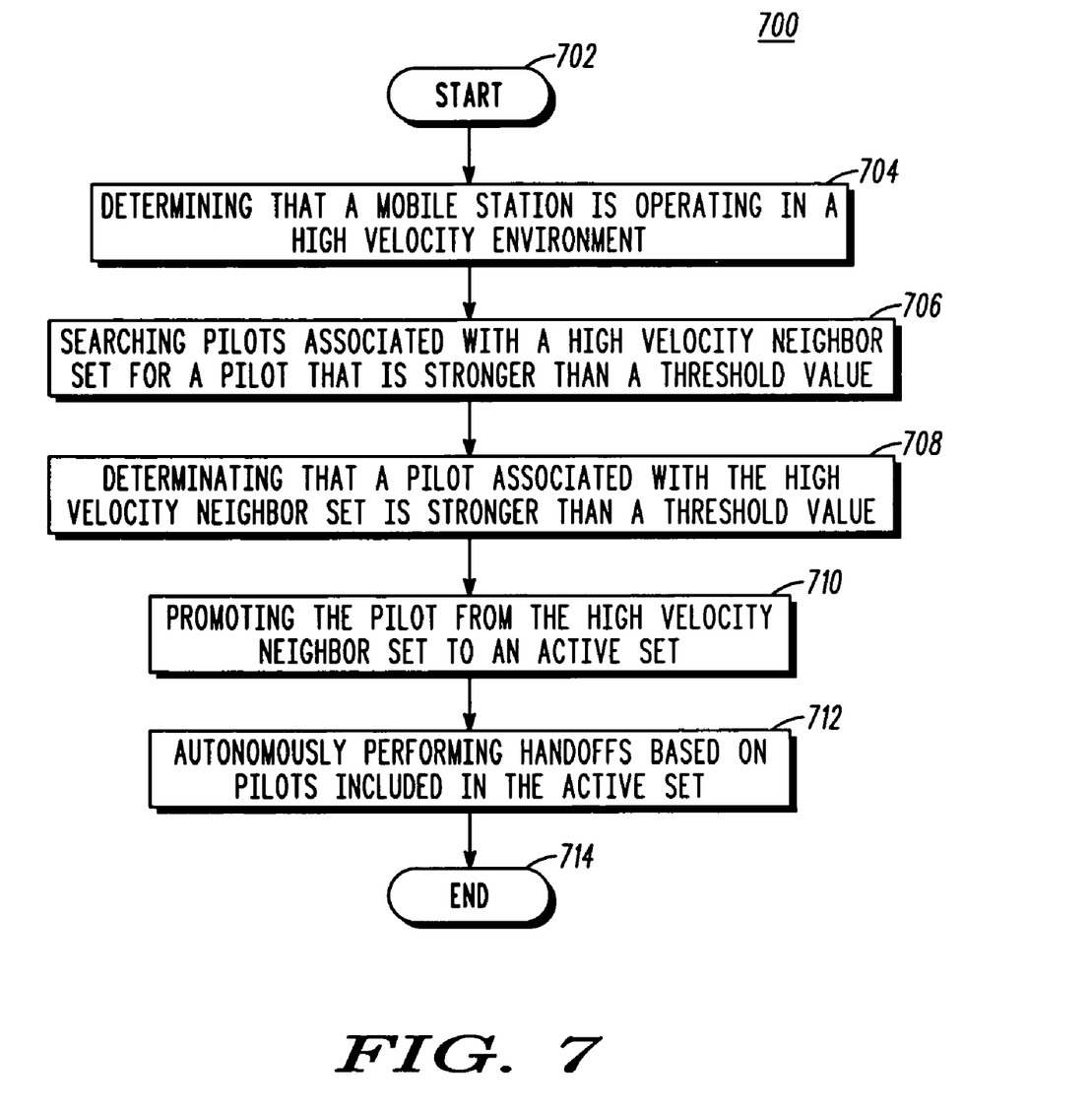
FIG. 7 is a logic flow diagram of the communication system of FIG. 1 operating in a high velocity mode in accordance with an embodiment of the present invention.

FIG. 7 is a logic flow diagram 700 of a high velocity mode of operation by communication system 100 when MS 106 is in idle mode in accordance with an embodiment of the present invention. Since MS 106 is in idle mode, RAN 114, and in particular a serving high velocity BS such as BS 120, cannot convey updates to High Velocity Neighbor List 416 via a forward traffic channel. Logic flow diagram 700 begins (702) when MS 106 self-determines (704), as described in detail above, that the MS is operating in a high velocity environment. In response to determining that the MS is operating in a high velocity environment, the MS constantly searches (706) pilots associated with High Velocity Neighbor Set 412 for a pilot that is stronger than a threshold value. The threshold value is maintained in the one or more memory devices 408 of the MS. When MS 106 determines (708) that a pilot associated with High Velocity Neighbor Set 412, for example, a pilot associated with BS 128, is stronger than the threshold value, the MS promotes (710) the pilot from High Velocity Neighbor Set 416 to Active Set 410. MS 106 autonomously performs (712) idle mode handoffs based on the pilots included in the Active Set 410. Logic flow 700 then ends (714).

Figure 8:
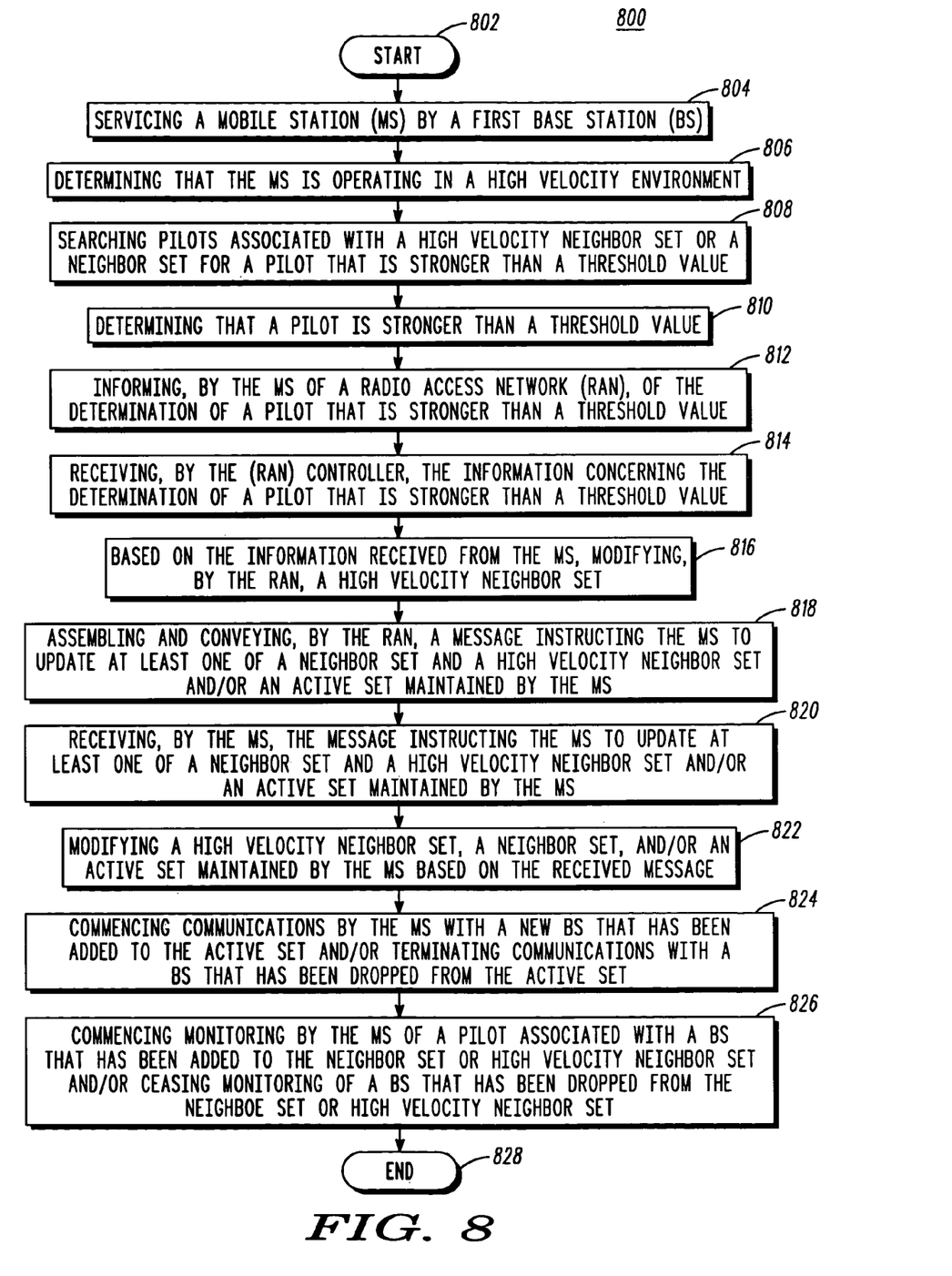
FIG. 8 is a logic flow diagram of the communication system of FIG. 1 operating in a high velocity mode in accordance with another embodiment of the present invention.

FIG. 8 is a logic flow diagram 800 of a high velocity mode of operation by communication system 100 when MS 106 is actively engaged in a communication via a forward traffic channel in accordance with another embodiment of the present invention. Logic flow diagram 800 begins (802) when MS 106 is serviced (804) by a first BS, such as BS 120, via one or more forward traffic channels, such as a forward traffic channel associated with air interface 108 or forward traffic channels associated with each of air interfaces 110 and 112, and one or more reverse traffic channels, such as a reverse traffic channel associated with air interface 108 or reverse traffic channels associated with each of air interfaces 110 and 112. RAN 114, such as RAN controller 116 or serving BS 120, determines (806), as is described in detail above, that MS 106 is operating in a high velocity environment.

MS constantly searches (808) pilots associated with a neighbor set stored in the one or more memory devices 408 of the MS for a pilot that is stronger than a threshold value, which threshold value is maintained in the one or more memory devices 408 of the MS. In one embodiment of the present invention, the neighbor set utilized by MS 106 in searching pilots is the neighbor set that was most recently utilized by the MS in idle mode prior to transitioning to active mode. For example, when MS 106 was most recently in a non-high velocity environment prior to transitioning to active mode, the neighbor set most recently utilized by the MS in searching pilots while in idle mode may have been Neighbor Set 412. Accordingly, MS 106 searches pilots associated with Neighbor Set 412 in performing step 808. By way of another example, when MS 106 was most recently in a high velocity environment prior to transitioning to active mode, the neighbor set most recently utilized by the MS in searching pilots while in idle mode may have been High Velocity Neighbor Set 416. Accordingly, MS 106 searches pilots associated with High Velocity Neighbor Set 416 in performing step 808. However, the designer of system 100 may utilize any one of numerous algorithms for determining which neighbor set is utilized by the MS in searching pilots in step 808.

Upon determining (810) that a pilot is stronger than the threshold value, MS 106 informs (812) RAN 114, and in particular RAN controller 116 via serving BS 120, of the determination of a pilot that is stronger than a threshold value, preferably by conveying a Pilot Strength Measurement Message (PSMM) to the RAN via the one or more reverse traffic channels. In response to receiving (814) the information concerning a determination of a pilot that is stronger than a threshold value, to determining that MS 106 is operating in a high velocity environment, and when the determined pilot is associated with a high velocity BS, RAN controller 116 modifies (816) the list of pilots maintained in High Velocity Neighbor Set 308 stored in the one or more memory devices 304. For example, RAN controller 114 may add a strong pilot to High Velocity Neighbor Set 308 and/or drop a weak pilot from the High Velocity Neighbor Set.

RAN controller 116 then assembles and conveys (818) to MS 106 a message instructing the MS to update the neighbor set being utilized by the MS to search pilots and/or to update an active set maintained by the MS, that is, Neighbor Set 412 or High Velocity Neighbor Set 416, and/or Active Set 410 based on the adjustments made by the controller to High Velocity Neighbor Set 308. In one embodiment of the present invention, the message instructing MS 106 to update the neighbor set and/or the active set may comprise a handoff message instructing MS 106 to add or delete a BS from Active Set 410 or to handoff to a new serving BS. In another embodiment of the present invention, the message instructing the MS to update the neighbor set and/or the active set may comprise a Neighbor List Update Message (NLUM). In still another embodiment of the present invention, the message instructing the MS to update the neighbor set and/or the active set may comprise a system configuration message or a system parameters message followed by a neighbor list message that informs of pilots for promotion to the neighbor set and/or active set of the MS.

Upon receiving (820) the message instructing the MS to update the neighbor set being utilized by the MS to search pilots and/or to update an active set of the MS, MS 106 modifies (822) the neighbor set being utilized by the MS and/or the active set, that is, Neighbor Set 412, High Velocity Neighbor Set 416, and/or Active Set 410 based on the received message. That is, based on the received message, MS 106 may promote a pilot to Neighbor Set 412, High Velocity Neighbor Set 416, and/or Active Set 410. The promoted pilot (s) are associated with high velocity BSs since the pilot(s) promoted by RAN controller 116 are pilots associated with high velocity BSs. MS 106 may then commence (824) communications with a new BS that has been added to the Active Set and/or terminate communications with an old BS that has been dropped from the Active Set. MS 106 further commences monitoring (826) a pilot associated with any BS added to the neighbor set utilized by the MS and/or ceases monitoring a pilot associated with any BS dropped from the neighbor set utilized by the MS and not added to Active Set 410 or a Candidate Set of the MS. Logic flow 800 then ends (828).

By promoting only pilots associated with high velocity BSs to a neighbor set and an active set utilized by an MS when the MS is traveling at an excessively high rate of speed, that is, is operating in a high velocity environment, communication system 100 reduces a quantity of handoffs and best pilot re-determinations that may occur, thereby enhancing system efficiency, reducing system processing load, and reducing the possibility of dropped calls during handoff. In one embodiment of the present invention, an MS in idle mode self-determines whether the MS is operating in a high velocity environment. Upon determining that the MS is operating in a high velocity environment, the MS transitions to searching pilots associated with a High Velocity Neighbor Set 416, as opposed to a Neighbor Set 412, of the MS and promoting pilots from the High Velocity Neighbor Set to an Active Set 410 of the MS. In another embodiment of the present invention, when an MS is active on a traffic channel, RAN controller 116 determines whether the MS is operating in a high velocity environment. Upon determining that the MS is operating in a high velocity environment, the RAN controller transitions to pushing pilots to the MS from a High Velocity Neighbor Set 308, as opposed to a Neighbor Set 306, of the RAN controller.

Referring again to FIG. 6, in another embodiment of the present invention, subsequent to communication system 100 transitioning to the high velocity mode of operation, MS 106, a serving high velocity BS, such as BS 120, or RAN 114, and in particular RAN controller 116, may determine (618) that the MS is no longer operating in a high velocity environment. In response to determining that the MS is no longer operating in a high velocity environment, communication system 100 transitions (620) to a non-high velocity, conventional mode of operation.

In one embodiment of the present invention, wherein MS 106 is in idle mode, MS 106 self-determines that the MS is no longer operating in a high velocity environment. Upon determining that MS 106 is no longer operating in a high velocity environment, communication system 100 transitions to a non-high velocity mode of operation by MS 106 automatically beginning searching pilots associated with Neighbor Set 412, as opposed to High Velocity Neighbor Set 416, and promoting pilots from the Neighbor Set to Active Set 410.

In another embodiment of the present invention, wherein MS 106 is actively engaged in communications via a forward traffic channel, RAN controller 116 determines that MS 106 is no longer operating in a high velocity environment. Upon determining that MS 106 is no longer operating in a high velocity environment, communication system 100 transitions to a non-high velocity mode of operation by RAN controller 116 pushing pilots from Neighbor Set 306, as opposed to High Velocity Neighbor Set 312, to MS 106 for promotion to a neighbor set and/or the active set of the MS.

In one embodiment of the present invention MS 106 or RAN controller 116 may determine whether MS 106 is operating in a high velocity environment based on a quantity of different best pilot signals determined by the MS within a predetermined period of time. When MS 106 is in idle mode, even though operating in the high velocity mode, the MS constantly monitors the pilots of BSs associated with Active Set 410 and of Neighbor Set 412. Periodically, MS 106 determines a quality metric with respect to each monitored pilot and based on the quality metrics determines a best pilot signal. MS 106 may then store information concerning the determined best pilot signal in the one or more memory devices 408 of the MS and/or may convey information concerning the determined best pilot signal to serving BS 120, and thereby to RAN controller 116.

Based on multiple best pilot signals determined by MS 106, the MS, serving BS, or RAN controller 116 may determine a quantity of different best pilot signals determined within a predetermined period of time. The MS, serving BS, or RAN controller 116, whichever is appropriate, then compares the quantity of best pilots determined within a predetermined period of time to a best pilot signal quantity threshold. When the quantity of best pilots determined within the predetermined period of time is less than the best pilot signal quantity threshold, the MS, serving BS, or RAN controller 116 may determine that the MS is no longer operating in a high velocity environment.

In another embodiment of the present invention, MS 106 or RAN controller 116 may determine whether the MS is operating in a high velocity environment based on a period of time during which the MS is serviced by a same BS. That is, each time MS 106 changes the BS serving the MS, MS 106 or RAN controller 116 stores information in the respective one or more memory devices 304, 408 concerning a time at which the MS changed the serving BS. Based on the stored times, MS 106 or RAN controller 116 further determines and stores in the respective one or more memory devices 304, 408 a length of time, that is a period of time, during which the MS was served by the most recently changed serving BS. The MS or RAN controller then compares the determined length of time to the time threshold. When the length of time exceeds the time threshold, or when a successive number of times that the determined length of time exceeds the time threshold exceeds the serving BS change threshold, the MS or RAN controller may determine that MS 106 is no longer operating in a high velocity environment.

In yet another embodiment of the present invention, MS 106 may determine whether the MS is operating in a high velocity environment based on a Doppler shift of signals received by the MS from RAN 114. Upon receiving a pilot from a BS serving the MS, MS 106 determines a Doppler shift the pilot. When the determined Doppler shift is less than the Doppler shift threshold, MS 106 may determine that the MS is no longer operating in a high velocity environment.

In still another embodiment of the present invention, RAN controller 116 may determine whether the MS is operating in a high velocity environment based on a quantity of handoffs involving the MS during a predetermined period of time. Each time MS 106 engages in a handoff, information concerning the handoff is stored in MM 118. As a result, MM 118 maintains a record of a quantity of handoffs engaged in by MS 106. When RAN controller 116 determines that a quantity of handoffs engaged in during the predetermined period of time is less than the handoff quantity threshold, RAN controller 116 may determine that MS 106 is no longer operating in a high velocity environment.

By providing for communication system 100 to transition from a high velocity mode of operation to a non-high velocity mode of operation, communication system 100 is provided flexibility of operation. Communication system 100 utilizes pilots associated with high velocity BSs for handoff determinations when MS 106 is traveling at a high rate of speed, and lifts the restriction on pilots when the MS 106 is standing still or is traveling at less than a high rate of speed. Accordingly, communication system 100 provides for an adaptable handoff operation that may be adapted to a rate of speed of the MS.

Referring still to FIG. 6, as noted above, at any time when MS 106 is in communication with RAN 114, and in particular with a serving BS 120, the MS may communicate with the RAN directly, that is, via air interface 108, or via repeater 104 and air interfaces 110 and 112. Accordingly, in one embodiment of the present invention, MS 106 may establish (622) a communication link with RAN 114 via air interface 108. However, in another embodiment of the present invention, the MS may be located in a vehicle that includes a high velocity repeater, such as vehicle 102 and repeater 104. In such an event, MS 106 may establish (624) communications with RAN 114 via air interface 110, repeater 104, and air interface 112. MS 106 may establish communications via repeater 104 either upon determining the presence of repeater 104 or upon transitioning to a high velocity mode of operation.

Repeater 104 periodically transmits a low power beacon, or pilot, signal. In one embodiment of the present invention, when MS 106 monitors pilots of BSs, the MS further monitors for the beacon signal of repeater 104. In response to detecting a repeater beacon signal, the MS compares a strength of the beacon signal to a beacon signal strength threshold that is stored in the one or more memory devices 408. When the detected beacon signal strength exceeds the beacon signal strength threshold, the MS tunes to air interface 112 associated with repeater 104 by executing a conventional handoff regardless of whether the MS is operating in the high velocity mode or has been instructed to transition to the high velocity mode. In another embodiment of the present invention, instead of executing a handoff, signals of repeater 104 may appear similar to a mulitpath component of a RAN 114 signal. In such an embodiment, a finger manager of MS 106 may walk off from the signals of RAN 114 to the time delay of the repeater signals. In still other embodiments of the present invention, MS 106 may not monitor the beacon signal of repeater 104 until the MS receives the system overhead message instructing the MS to switch to the high velocity mode, or the MS, although constantly monitoring the repeater beacon signal, may not tune to air interface 112, that is, handoff to repeater 104, until the MS receives the system overhead message.

Upon switching to the high velocity mode of operation and tuning to the forward link and the reverse link of air interface 112, MS 106 communicates (626) with RAN 114 via repeater 104. That is, MS 106 conveys communications intended for RAN 114 to repeater 104 via a reverse link of air interface 112. Repeater 104 then forwards the communications received from MS 106 to RAN 114 via a reverse link of air interface 110. In turn, RAN 114 conveys communications intended for MS 106 to repeater 104 via a forward link of air interface 110. Repeater 104 then forwards the communications received from RAN 114 to MS 106 via a forward link of air interface 110.

In exchanging communications with RAN 114, repeater 104 provides Doppler shift compensation to the signals received from, and transmitted to, RAN 114. By providing a repeater that can provide high velocity Doppler shift compensation, communication system 100 overcomes the inability of an MS, such as MS 106, to compensate for Doppler shifts resulting from high velocity movement of the MS, typically movement in excess of 120 kilometers per hour.

Repeater 104 provides high velocity Doppler shift compensation by monitoring pilots associated with one or more BSs of the multiple BSs 120-129 of communication system 100. For example, at any particular time and similar to MS 106, repeater 104 may be provided wireless communication services by a serving BS and may monitor pilots associated with the serving BS. Repeater 104 derives the Doppler shift of each received pilot and, based on the determined Doppler shift, determines multiple Doppler shift compensation factors. When repeater 104 is acting as a repeater with respect to signals exchanged between MS 106 and RAN 114, the repeater then applies a first Doppler shift compensation factor of the multiple Doppler shift compensation factors to the signals received from RAN 114 and intended for MS 106 and applies a second Doppler shift compensation factor of the multiple Doppler shift compensation factors to the signals received from MS 106 and intended for RAN 114.

A determination of a Doppler shift and Doppler shift compensation are well-known in the art. For example, in one embodiment of the present invention, repeater 104 may determine a Doppler shift of a received pilot and further determine Doppler shift compensation factors as described in detail in U.S. Pat. No. 6,449,489, which patent is hereby incorporated herein in its entirety. In another embodiment of the present invention, repeater 104 may determine a Doppler shift of a received pilot and further determine Doppler shift compensation factors as follows. Each pilot associated with a BS and monitored by repeater 104 includes timing synchronization for a decoding of signals transmitted by the associated BS. Repeater 104 includes an internal oscillator, and with reference to the internal oscillator and each monitored pilot, or BS, is able to determine the center of the pilot channel associated with the BS. As vehicle 102, in which repeater 104 is located, moves at an increasing speed, the repeater is able to determine a frequency offset, that is, a Doppler shift, of pilots received from a monitored BS. The repeater stores the determined frequency offset in a memory of the repeater. When repeater 104 is acting as a repeater with respect to signals exchanged between MS 106 and RAN 114, the repeater determines Doppler compensation factors based on the determined frequency offset and applies the determined Doppler compensation factors to signals received from, and transmitted to, RAN 114.

By determining Doppler compensation factors and applying the determined Doppler compensation factors to signals received from, and transmitted to, RAN 114, repeater 104 provides the Doppler compensation for MS 106 when the MS is operating in a high velocity mode and exchanges communications with RAN 114. That is, repeater 104 receives signals conveyed by RAN 114 and intended for MS 106. Repeater 104 adjusts the signal received from RAN 114 to compensate for a Doppler shift, that is, a applies a first frequency offset to the signal received from RAN 114 to produce a first frequency offset signal and to compensate for a Doppler shift experienced by the signal when conveyed by RAN 114 to repeater 104, which Doppler shift compensation is based on a Doppler shift of a pilot received by the repeater. Repeater 104 then conveys the adjusted signal to MS 106 via the forward link of air interface 112. Repeater 104 further receives signals conveyed by MS 106 and intended for RAN 114. Repeater 104 adjusts the signal received from MS 106 to provide compensation for a Doppler shift, that is, applies a second frequency offset to the signal received from MS 106 to produce a second frequency offset signal and to compensate for the Doppler shift that will be introduced to signal when conveyed by repeater 104 to RAN 114 via air interface 110, in effect providing frequency predistortion, which Doppler shift compensation is also based on the Doppler shift of the pilot received by the repeater. Repeater 104 then conveys the adjusted signal to RAN 114 via the reverse link of air interface 110.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. It is further understood that the use of relational terms, if any, such as first and second, top and bottom, and the like are used solely to distinguish one entity or action from another entity or action without necessarily requiring or implying any actual such relationship or order between such entities or actions.

What is claimed is:

1. A method of wireless communication in a high velocity environment comprising:
   maintaining, by a mobile station, a plurality of neighbor sets comprising a High Velocity Neighbor Set and a Neighbor Set, wherein the High Velocity Neighbor Set comprises one or more pilot signals not included in the Neighbor Set;
   determining whether the mobile station is operating in a high velocity environment; and
   when the mobile station is operating in a high velocity environment, utilizing the High Velocity Neighbor Set for promotion of pilot signals.

2. The method of claim 1, wherein determining whether the mobile station is operating in a high velocity environment comprises:
   determining a plurality of best pilot signals within a period of time, wherein each best pilot signal of the plurality of best pilot signals is different than the other pilot signals of the plurality of best pilot signals; and
   when a quantity of best pilot signals determined within the period of time exceeds a best pilot signal quantity threshold, determining that the mobile station is operating in a high velocity environment.

3. The method of claim 1, wherein determining whether the mobile station is operating in a high velocity environment comprises:
   determining a period of time during which the mobile station is serviced by a same base station; and
   when the period of time is less than a time threshold, determining that the mobile station is operating in a high velocity environment.

4. The method of claim 1, wherein determining whether the mobile station is operating in a high velocity environment comprises:
   receiving a signal from a wireless infrastructure;
   determining a Doppler shift of the received signal; and
   when the Doppler shift exceeds a Doppler shift threshold, determining that the mobile station is operating in a high velocity environment.

5. The method of claim 1, wherein determining whether the mobile station is operating in a high velocity environment comprises:
   engaging in a plurality of handoffs during a period of time; and
   when a quantity of handoffs engaged in during the period of time exceeds a handoff quantity threshold, determining that the mobile station is operating in a high velocity environment.

6. The method of claim 1, further comprising utilizing the High Velocity Neighbor Set for handoffs.

7. The method of claim 1, further comprising, when the mobile station is operating in a high velocity mode:
   determining whether the mobile station is no longer operating in a high velocity environment; and
   when the mobile station is no longer operating in a high velocity environment, transitioning to utilization of the Neighbor Set for promotion of pilot signals.

8. The method of claim 7, wherein determining whether the mobile station is no longer operating in a high velocity environment comprises:
   determining a plurality of best pilot signals within a period of time, wherein each best pilot signal of the plurality of best pilot signals is different than the other pilot signals of the plurality of best pilot signals; and
   when a quantity of best pilot signals determined within the period of time is less than a best pilot signal quantity threshold, determining that the mobile station is no longer operating in a high velocity environment.

9. The method of claim 8, wherein the plurality of best pilot signals are determined based on pilot signals of the Neighbor Set.

10. The method of claim 8, wherein the plurality of best pilot signals are determined based on pilot signals of the High Velocity Neighbor Set.

11. The method of claim 7, wherein determining whether the mobile station is no longer operating in a high velocity environment comprises:
    determining a period of time during which the mobile station is serviced by a same base station; and
    when the period of time exceeds a time threshold, determining that the mobile station is no longer operating in a high velocity environment.

12. The method of claim 7, wherein determining whether the mobile station is no longer operating in a high velocity environment comprises:
    receiving a signal from a wireless infrastructure;
    determining a Doppler shift of the received signal; and
    when the Doppler shift is less than a Doppler shift threshold, determining that the mobile station is no longer operating in a high velocity environment.

13. The method of claim 7, wherein determining whether the mobile station is operating in a high velocity environment comprises:
    engaging in a plurality of handoffs during a period of time; and
    when a quantity of handoffs engaged in during the period of time is less than a handoff quantity threshold, determining that the mobile station is no longer operating in a high velocity environment.

14. A mobile station comprising:
    at least one memory device that maintains a plurality of neighbor sets, wherein a first neighbor set of the plurality of neighbor sets comprises a Neighbor Set and a second neighbor set of the plurality of neighbor sets comprises a High Velocity Neighbor Set and wherein the High Velocity Neighbor Set comprises one or more pilot signals not included in the Neighbor Set;
    a processor coupled to the at least one memory device that determines whether the mobile station is operating in a high velocity environment and, in response to determining that the mobile station is operating in a high velocity environment, utilizes the High Velocity Neighbor Set for promotion of pilot signals.

15. The mobile station of claim 14, wherein the processor determines that the mobile station is operating in a high velocity environment based on received instructions to utilize the High Velocity Neighbor Set.

16. The mobile station of claim 15, wherein the processor utilizes the High Velocity Neighbor Set for handoffs.

17. The mobile station of claim 14, wherein the processor determines whether the mobile station is operating in a high velocity environment by determining a plurality of best pilot signals within a period of time, wherein each best pilot signal of the plurality of best pilot signals is different than the other pilot signals of the plurality of best pilot signals, and when a quantity of best pilot signals determined within the period of time exceeds a best pilot signal quantity threshold, determining that the mobile station is operating in a high velocity environment.

18. The mobile station of claim 17, wherein the processor determines the plurality of best pilot signals based on pilot signals of the Neighbor Set.

19. The mobile station of claim 14, wherein the processor determines whether the mobile station is operating in a high velocity environment by determining a period of time during which the mobile station is serviced by a same base station and, when the period of time is less than a time threshold, determining that the mobile station is operating in a high velocity environment.

20. The mobile station of claim 14, wherein the processor determines whether the mobile station is operating in a high velocity environment by receiving a signal from a wireless infrastructure, determining a Doppler shift of the received signal, and when the Doppler shift exceeds a Doppler shift threshold, determining that the wireless communication device is operating in a high velocity environment.

21. The mobile station of claim 14, wherein the processor determines whether the mobile station is operating in a high velocity environment by determining a quantity of handoffs engaged in by the mobile station during a period of time and, when the quantity of handoffs engaged in during the period of time exceeds a handoff quantity threshold, determining that the mobile station is operating in a high velocity environment.

22. The mobile station of claim 14, wherein, when the mobile station is operating in a high velocity mode, the processor determines whether the mobile station is no longer operating in a high velocity environment and, when the mobile station is no longer operating in a high velocity environment, utilizes the Neighbor Set for promotion of pilot signals.

23. The mobile station of claim 22, wherein the processor determines whether the mobile station is no longer operating in a high velocity environment by determining a plurality of best pilot signals within a period of time, wherein each best pilot signal of the plurality of best pilot signals is different than the other pilot signals of the plurality of best pilot signals, and when a quantity of best pilot signals determined within the period of time is less than a best pilot signal quantity threshold, determining that the mobile station is no longer operating in a high velocity environment.

24. The mobile station of claim 22, wherein the processor determines whether the mobile station is no longer operating in a high velocity environment by determining a period of time during which the mobile station is serviced by a same base station and when the period of time exceeds a time threshold, determining that the mobile station is no longer operating in a high velocity environment.

25. The mobile station of claim 22, wherein the processor determines whether the mobile station is no longer operating in a high velocity environment by receiving a signal from a wireless infrastructure, determining a Doppler shift of the received signal, and when the Doppler shift is less than a Doppler shift threshold, determining that the mobile station is no longer operating in a high velocity environment.

26. The mobile station of claim 22, wherein the processor determines whether the mobile station is operating in a high velocity environment by engaging in a plurality of handoffs during a period of time and when a quantity of handoffs engaged in during the period of time is less than a handoff quantity threshold, determining that the mobile station is no longer operating in a high velocity environment.

27. A radio access network controller comprising:
at least one memory device that maintains a plurality of neighbor sets in association with a mobile station; and
a processor coupled to the at least one memory device that determines whether the mobile station is operating in a high velocity environment, when the mobile station is operating in a high velocity environment adjusts a first neighbor set of the plurality of neighbor sets and conveys an instruction to promote a pilot based on the adjustment of the first neighbor set of the plurality of neighbor sets, when the mobile station is not operating in a high velocity environment adjusts a second neighbor set of the plurality of neighbor sets and conveys an instruction to promote a pilot based on the adjustment of the second neighbor set of the plurality of neighbor sets, and wherein the first neighbor set includes one or more pilots not included in the second neighbor set.

28. The radio access network controller of claim 27, wherein the processor determines whether the mobile station is operating in a high velocity environment by determining a period of time during which the mobile station is serviced by a same base station and, when the period of time is less than a time threshold, determining that the mobile station is operating in a high velocity environment.

29. The radio access network controller of claim 27, the processor determines whether the mobile station is operating in a high velocity environment by determining a quantity of handoffs engaged in by the mobile station during a period of time and when a quantity of handoffs engaged in during the period of time exceeds a handoff quantity threshold, determining that the mobile station is operating in a high velocity environment.

30. The radio access network controller of claim 27, wherein, when the mobile station is operating in a high velocity environment, the processor further determines whether the mobile station is no longer operating in a high velocity environment and when the mobile station is no longer operating in a high velocity environment, transitions the mobile station to a non-high velocity mode of operation wherein the mobile station no longer utilizes the High Velocity Neighbor Set for handoffs.

31. The radio access network controller of claim 30, wherein the processor determines whether the mobile station is no longer operating in a high velocity environment by determining a period of time during which the mobile station is serviced by a same base station and, when the period of time exceeds a time threshold, determining that the mobile station is no longer operating in a high velocity environment.

32. The radio access network controller of claim 30, the processor determines whether the mobile station is operating in a high velocity environment by determining a quantity of handoffs engaged in by the mobile station during a period of time and when a quantity of handoffs engaged in during the period of time is less than a handoff quantity threshold, determining that the mobile station is no longer operating in a high velocity environment.

33. A method of operating a mobile station in a high velocity environment comprising:
determining whether the mobile station is operating in a high velocity environment;
maintaining, by a mobile station, a plurality of neighbors sets comprising a Neighbor Set and a High Velocity Neighbor Set, wherein the High Velocity Neighbor Set comprises one or more pilot signals not included in the Neighbor Set;

in response to determining that the mobile station is operating in a high velocity environment, searching pilot signals associated with the High Velocity Neighbor Set for a pilot signal stronger than a threshold value; and in response to determining a pilot signal stronger than the threshold value, modifying an Active Set.

34. A mobile station comprising:

at least one memory device that maintains a plurality of neighbors sets comprising a Neighbor Set and a High Velocity Neighbor Set, wherein the High Velocity Neighbor Set comprises one or more pilot signals not included in the Neighbor Set; and a processor coupled to the at least one memory device that determines whether the mobile station is operating in a high velocity environment, in response to determining that the mobile station is operating in a high velocity environment, searches pilot signals associated with the High Velocity Neighbor Set for a pilot signal stronger than a threshold value, and in response to determining a pilot signal stronger than the threshold value, modifies an Active Set.

35. A method for promoting pilot signals in a high velocity environment comprising:

maintaining, by a mobile station, a plurality of neighbors sets comprising a Neighbor Set and a High Velocity Neighbor Set, wherein the High Velocity Neighbor Set comprises one or more pilot signals not included in the Neighbor Set;

searching pilot signals associated with at least one of the Neighbor Set and the High Velocity Neighbor Set for a pilot signal stronger than a threshold value;

upon determining a pilot signal stronger than the threshold value, transmitting information concerning the pilot signal;

in response to transmitting information concerning the pilot signal, receiving instructions promote the pilot signal to an Active Set; and in response to receiving the instruction, promoting the pilot signal to the Active Set.

36. A radio access network controller comprising:

at least one memory device that maintains a plurality of neighbors sets in association with a mobile device, wherein the plurality of neighbors sets comprises a Neighbor Set and a High Velocity Neighbor Set and wherein the High Velocity Neighbor Set comprises one or more pilot signals not included in the Neighbor Set; and a processor coupled to the at least one memory device that receives information from the mobile station concerning a pilot signal stronger than a threshold value, determines that the mobile station is operating in a high velocity environment and, in response to receiving the information and determining that the mobile station is operating in a high velocity environment, adjusts a High Velocity Neighbor Set and conveys information to the mobile station corresponding to the adjustment.

37. The radio access network controller of claim 36, wherein the processor conveys the changes by conveying a system configuration message indicating a modification of at High Velocity Neighbor List and further conveys the modification of the High Velocity Neighbor List.

38. The radio access network controller of claim 36, wherein the processor further modifies the High Velocity Neighbor Set maintained in the at least one memory device based on the information received from the mobile station.

39. A radio access network controller comprising:

at least one memory device that maintains a plurality of neighbors sets in association with a mobile device, wherein the plurality of neighbors sets comprises a Neighbor Set and a High Velocity Neighbor Set and wherein the High Velocity Neighbor Set comprises one or more pilot signals not included in the Neighbor Set; and a processor coupled to the at least one memory device that determines that the mobile station is operating in a high velocity environment and, in response to determining that the mobile station is operating in a high velocity environment, conveys a High Velocity Neighbor List to the mobile station.

* * * * *